Jan. 31, 1961 W. E. HIGHLEY 2,969,964
AUTOMATIC CHOKE FOR CARBURETORS
Filed March 17, 1958 3 Sheets-Sheet 1

INVENTOR.
WENFORD E. HIGHLEY
BY
Bertram H. Mann
ATTORNEY

Jan. 31, 1961   W. E. HIGHLEY   2,969,964
AUTOMATIC CHOKE FOR CARBURETORS
Filed March 17, 1958   3 Sheets-Sheet 2

INVENTOR.
WENFORD E. HIGHLEY
BY
Bertram H. Mann
ATTORNEY

Jan. 31, 1961  W. E. HIGHLEY  2,969,964
AUTOMATIC CHOKE FOR CARBURETORS
Filed March 17, 1958  3 Sheets-Sheet 3

INVENTOR.
WENFORD E. HIGHLEY
BY Bertram H. Mann
ATTORNEY

United States Patent Office 2,969,964
Patented Jan. 31, 1961

2,969,964

AUTOMATIC CHOKE FOR CARBURETORS

Wenford E. Highley, Normandy, Mo., assignor to ACF Industries, Incorporated, New York, N.Y., a corporation of New Jersey Filed Mar. 17, 1958, Ser. No. 721,915

16 Claims. (Cl. 261—39)

This invention relates to carburetors and more particularly to an improved automatic control for a carburetor choke valve.

Conventional carburetors are provided with an induction conduit in which fuel and air mix to form a combustible mixture which is drawn through an induction system and into the engine cylinders. The induction conduit is provided with a throttle valve for controlling the amount of fuel-air mixture delivered to the engine, and a choke valve for controlling the richness of the mixture. When the engine is cold, a richer fuel-air mixture is required, and to this end a temperature responsive device, usually a thermostatic coil spring, responsive to engine temperature, is provided to maintain the choke valve substantially closed when the engine is running cold and to permit the choke valve to open gradually as the engine warms up. The choke control also includes a suction motor, usually a cylinder and piston, responsive to suction in the induction system of the engine. The suction motor acts against the closing force of the temperature responsive device and immediately upon starting of the engine, a predetermined pull-off or initial opening of the choke valve is effected by the suction motor. In conventional automatic choke controls, the suction applied to the suction motor after starting acts to draw warm air from the engine over the thermostatic coil, and is substantially constant for any given engine load and speed, resulting in the choke opening gradually as the force of the temperature responsive means is reduced during warm-up. However, during the initial portion of the warm-up period, the engine may be using an unnecessarily rich fuel-air mixture, resulting in a waste of fuel and an increase in the total time required for the engine to reach its normal operating temperature. Such an effect is particularly noticeable when cruising slowly, as in city traffic, especially in cold weather, when it may happen that the engine temperature builds up very slowly. If the carburetor is calibrated to overcome this difficulty by opening the choke valve more rapidly during the early portion of the warm-up period, the engine is likely to run far too lean during the later portion of the warm-up period, resulting in dips at this time. To assure proper operation of most engines, it is usually desirable that the suction motor act to positively urge the choke valve open until the valve has reached its normal operating position. It is also generally desirable that the suction motor exert some opening force on the choke valve at all times to reduce excessive flutter in the choke valve.

It is, therefore, an object of this invention to provide an improved automatic control for the carburetor choke valve.

Another object of this invention is to provide an improved automatic choke valve control in which the rate of opening of the choke valve is increased during the early stages of the warm-up period, and is slowed during latter stages of the warm-up period.

Another object of this invention is to provide an improved carburetor in which a leaner fuel-air mixture is provided during the early stages of the warm-up period of the engine.

Still another object of this invention is to provide an improved suction motor in which the force exerted by the motor is regulated by automatically bleeding into the suction chamber a medium at a higher pressure.

Additional objects and advantages of the invention will become apparent from the following description and drawings, in which.

The invention relates to an automatic choke control applicable to many types of carburetors. For purposes of illustration and description, the invention has been shown as applied to a conventional carburetor, but it is equally suitable for use with other carburetors. The carburetor will, therefore, be only briefly described.

Figure 1:
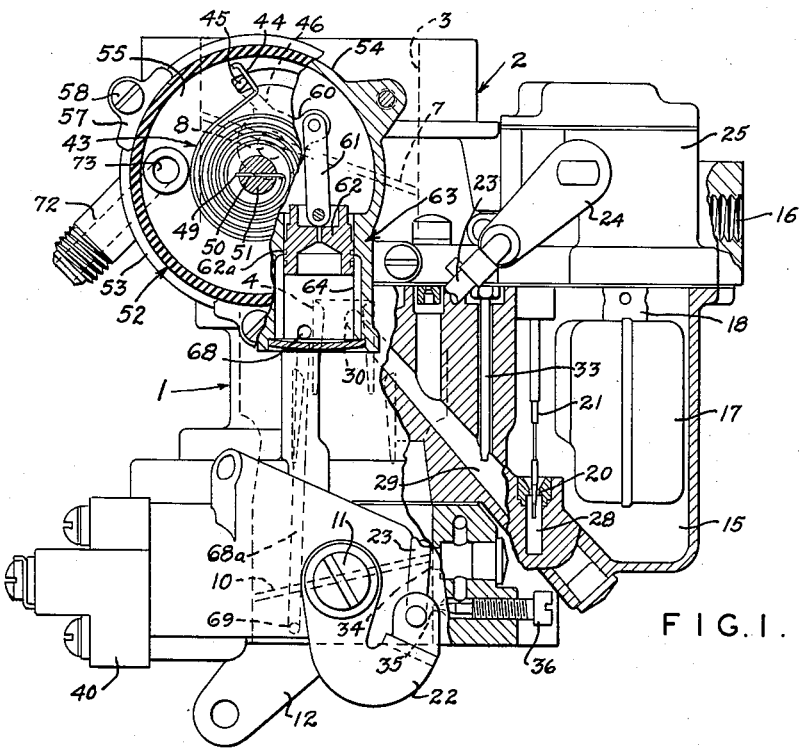
Fig. 1 is a fragmentary sectional elevation view of a carburetor prior to starting, and illustrating an embodiment of the invention.

Referring to the drawings, an embodiment of the invention is illustrated in Fig. 1 as applied to a typical carburetor. The carburetor includes a body 1, a cover 2, and an induction conduit 3, including a venturi cluster 4, in the body and cover. An unbalanced choke valve 7 is secured to a shaft 8 pivotally mounted in the walls of the upper portion, or air horn, of the induction conduit. A throttle valve 10 is secured to a throttle shaft 11 pivotally mounted in the lower portion of the induction conduit. A lever 12 is fixed to an extremity of the throttle shaft 11 projecting outwardly from the carburetor body for manually controlling the position of the throttle valve. A fuel chamber 15 receives fuel through inlet 16, the level of the fuel in the chamber being controlled by float 17 and a cooperating needle valve in cage 18. The main fuel system includes an orifice 20 and metering rod 21 for varying the amount of fuel delivered to the induction conduit responsive to throttle position. Fuel flows through the main metering orifice 20, into passage 28, and then into the main fuel passage 29 from which it is drawn through nozzle 30 into the venturi cluster 4 during normal and high speed operation of the engine. Throttle position determines the position of the metering rod 21 in orifice 20 through a linkage including a lever 22 fixed to an extremity of the throttle shaft 11, link 23 and lever 24 which controls a linkage inside of housing 25 for actuating both the metering rod 21 and an accelerating pump (not shown). The metering rod may also be controlled by engine suction. The idle circuit includes an idle tube 33 opening into the main fuel passage 29. Fuel is drawn through the idle tube 33 and then through a typical idle system which may include a by-pass, economizer, and bleed, and then through idle ports 34 and 35. Idle port 35 is provided with an adjusting screw 36 for varying the idle mixture. A conventional starter switch 40 is shown on the carburetor for closing an electric circuit from a manual switch to a starter only when the engine is stopped, or, preferably, for closing a starter circuit only when the engine is stopped, and responsive to opening of the throttle valve.

The choke control includes a thermostatic spring 43 having a hooked end 44 engaging a lug 45 on the end of lever 46 fixed to the choke shaft 8, and an inner end 49 fixed in a slot 50 in a lug 51 integral with a cup-shaped cover 52. The cover 52 has a flange 53 which abuts an edge of a cup-shaped portion 54 on the carburetor cover 2. The cover 52 is rotatable with respect to the cup 54 and is clamped in place by plates 57 and bolts 58 to provide a substantially sealed chamber 55. The cover 52 may be rotated to adjust the force exerted by the thermostatic spring 43 on the lug 45. The thermostatic spring 43 is of the type which uncoils upon being heated to reduce the force on lug 45. When the engine is at normal operating temperature, the choke valve 7 is open and the spring 43 exerts no force on lug 45. As shown in the drawing, the thermostatic spring 43 is cold and is maintaining the choke valve 7 tightly closed against the walls of the induction conduit 3. Lever 46 has a fixed arm 60, and pivoted thereto is a link 61, the other end of the link 61 being pivoted to a piston 62 of suction motor 63. The piston 62 is slidable in cylinder 64. The bottom of the cylinder 64 is sealed by a disk, and the piston 62 is provided with sealing grooves 62a. A port 68 opens into the cylinder 64 and connects with a passageway 68a opening into the induction conduit through a port 69 downstream from the throttle valve 10. A threaded nipple 72, integral with cup 54, is adapted to be connected with a source of engine heat, such as a stove on the exhaust manifold, or into the exhaust manifold, itself. The nipple opens into the thermostatic spring chamber 55 through a port 73. As will be more fully described hereinafter, after the engine has been started, warm air is drawn into the thermostatic spring chamber 55 through the port 73, then into the cylinder 64, and through passageway system 68, 68a, and 69 into the induction conduit 3.

Figure 2:
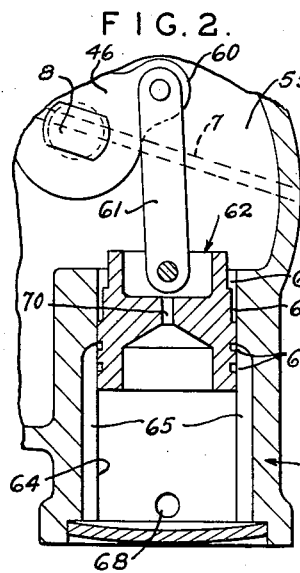
Fig. 2 is an enlarged sectional elevation view of a portion of Fig. 1 illustrating a suction motor prior to starting.

Fig. 2 shows the suction motor 63 to an enlarged scale. As illustrated in Figs. 1 and 2, the carburetor is shown prior to cranking the engine preparatory to starting. The choke valve 7 is closed and the piston 62 is held in its raised position by the thermostatic spring 43. In this embodiment, the cylinder 64 is provided with a pair of passages, or grooves 65, of equal length. The piston 62 is provided with a pair of by-passes 66 and 67, in this embodiment, peripheral or circumferential steps. In each embodiment, the by-passes have leading portions or ends which are first uncovered by the passages in the cooperating member of the suction motor. Here the leading portion is the bottom of steps 66 and 67.

Figure 3:
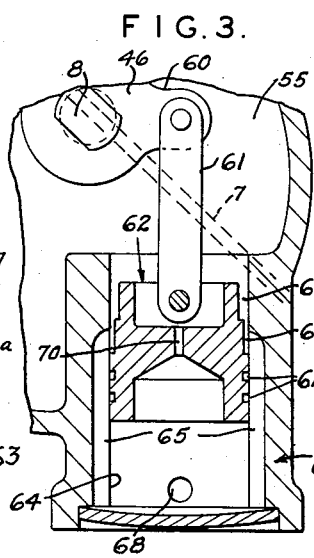
Fig. 3 is a view similar to Fig. 2 illustrating the suction motor immediately after starting.
Figure 4:
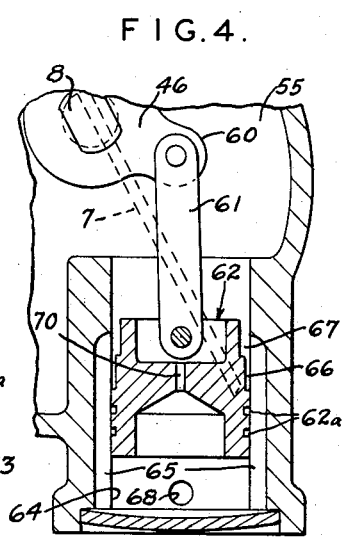
Fig. 4 is a view similar to Figs. 2 and 3 illustrating the suction motor during the latter portion of the warm-up period.

Upon cranking the engine, a slight vacuum is applied in the cylinder 64 through the port 68. As soon as the engine starts, a much greater vacuum is applied through the port 68, drawing the piston 62 into the cylinder 64 until the lower end of the first by-pass 66 has passed the top end of the grooves 65. The piston 62 works against the cold thermostatic spring 43. As soon as the lower end of by-pass 66 passes the top end of the groove 65, warm air will be drawn through the nipple 72 and port 73 into the thermostatic spring chamber 55, heating the spring 43, and will pass through the by-pass 66 into the groove 65, cylinder 64, and out through the suction port 68. The piston 62 normally hesitates in the position shown in Fig. 3 until the engine has warmed up sufficiently to start heating the thermostatic spring 43, reducing the tension therein and permitting the piston to move downwardly in the cylinder 64 at a relatively constant rate until the lower end of by-pass 67 passes the top end of groove 65, as shown in Fig. 4, whereupon the rate of downward movement of the piston will be substantially retarded because of the larger by-pass area. Although the choke valve 7 is opened more rapidly during the phase illustrated in Fig. 3, the thermostatic spring 43 is heated slowly because a relatively small amount of warm air can be drawn through by-pass 66, and therefore should the engine be stopped, as the suction motor 63 is then ineffective, the thermostatic spring 43 will close the choke valve sufficiently to permit easy starting. After the by-pass 67 clears the top of groove 65, the action of the suction motor 63 in opening the choke valve 7 is substantially the same as the action of a conventional piston. That is, the rate of opening of the choke valve 7 is substantially the same as that of a conventional choke control. A major improvement in the functioning of the choke control resides in the more rapid opening of the choke valve 7 during the initial warm-up period because of the reduced area of the by-pass 66 and resultant increased suction on piston 62 and, therefore, a more rapid movement of the pistol to the position in Fig. 4. In the event that a relatively weak thermostatic spring 43 is utilized, it may be desirable in calibrating the carburetor to provide a calibrated passage 70 through the piston 62 to reduce the effect of suction on the piston. Because of the more rapid opening movement and greater force of the piston 62 during the initial stages of the warm-up period, a relatively light spring 43 may be used.

Figure 5:
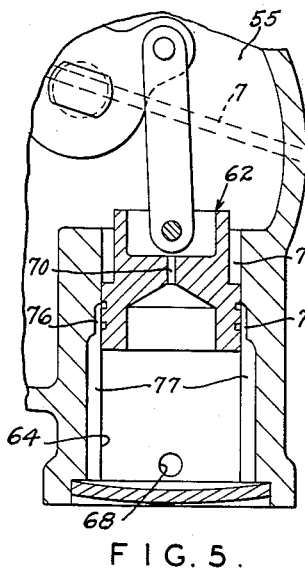
Fig. 5 is a sectional elevation view of a suction motor, and illustrates another embodiment of the invention prior to starting.
Figure 6:
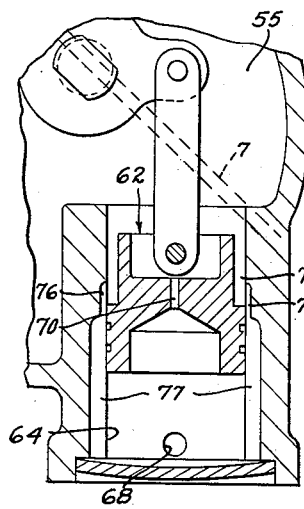
Fig. 6 is a view similar to Fig. 5 illustrating the suction motor immediately after starting.
Figure 7:
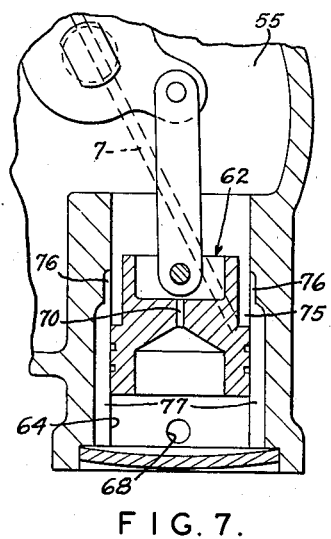
Fig. 7 is a view similar to Figs. 5 and 6 illustrating the suction motor during the latter portion of the warm-up period.
Figure 8:
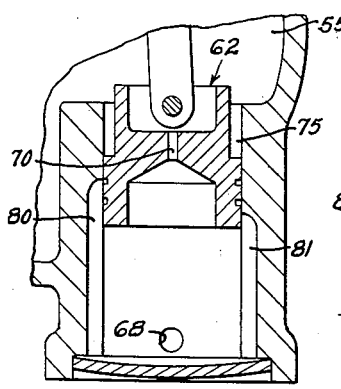
Fig. 8 is a sectional elevation view of a suction motor, and illustrates another embodiment of the invention prior to starting.

In the embodiment shown in Figs. 5 through 7, the piston 62 is provided with a single step 75, and the cylinder 64 is provided with a first by-pass or recess 76 and a second by-pass or recess 77. Fig. 5 shows the position of the parts prior to starting with both by-passes 76 and 77 sealed from the thermostatic spring chamber 55 by the piston 62. In Fig. 6, the engine has been started, and the lower end of the reduced portion 75 of the piston has been drawn down past the by-pass 76 to provide for the initial pull-off of the choke valve. As in the prior embodiment, the piston 62 will hesitate in the position shown in Fig. 6 until the thermostatic spring 43 warms up sufficiently to begin losing tension, whereupon the piston will move at a relatively rapid rate to the position shown in Fig. 7 wherein the lower end of the reduced portion 75 of the piston has uncovered the top end of the second by-pass 77, and the piston 62 will then continue to be drawn into the cylinder 64 at a reduced rate of speed, opening the choke valve 7 at approximately the same rate as would a conventional choke control.

Figure 9:
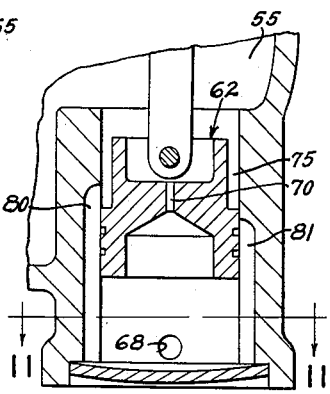
Fig. 9 is a view similar to Fig. 8 illustrating the suction motor after starting.
Figure 10:
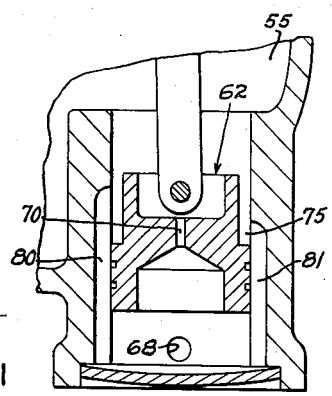
Fig. 10 is a view similar to Figs. 8 and 9 illustrating the suction motor during the latter portion of the warm-up period.
Figure 11:
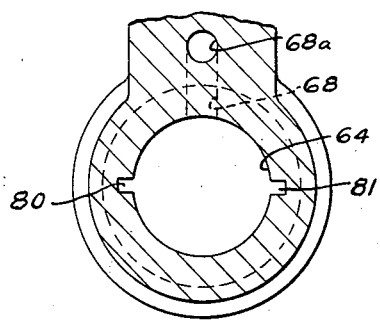
Fig. 11 is a sectional view taken on the line 11—11 in Fig. 9.

In the embodiment shown in Figs. 8 through 11, the piston 62 is again provided with the reduced portion 75, as in the embodiment shown in Figs. 5 through 7, but the cylinder is provided with a first by-pass or recess 80 longer than a second by-pass or recess 81. Fig. 8 again illustrates the position of the parts prior to starting the engine with both by-passes 80 and 81 sealed from chamber 55 by the piston 62. In Fig. 9, the engine has been started and the initial pull-off effected by suction drawing the lower end of the reduced portion 75 of the piston past the top end of the first by-pass 80. Again, the piston will hesitate in this position until the spring 43 has warmed up slightly, whereupon it will move at a relatively rapid rate until the lower end of the reduced portion 75 uncovers the top end of the second by-pass 81, as shown in Fig. 10, whereupon the piston will continue to be drawn into the cylinder at a much slower rate, corresponding, generally, to the rate of choke valve opening of a conventional choke control.

Figure 12:
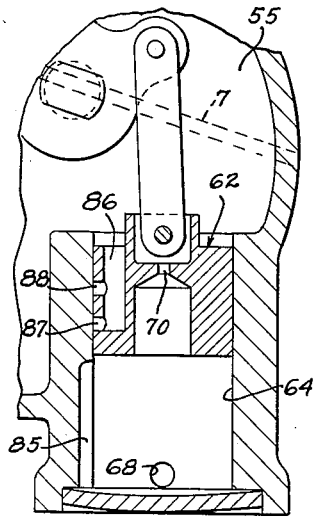
Fig. 12 is a sectional elevation view of a suction motor, and illustrates another embodiment of the invention prior to starting.
Figure 13:
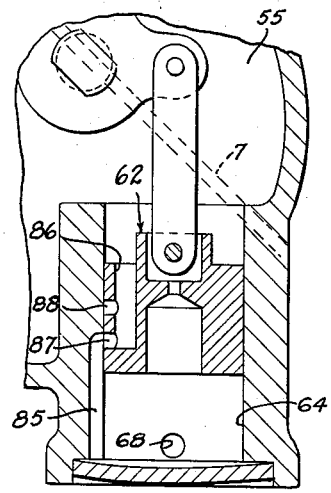
Fig. 13 is a view similar to Fig. 12 illustrating the suction motor immediately after starting.
Figure 14:
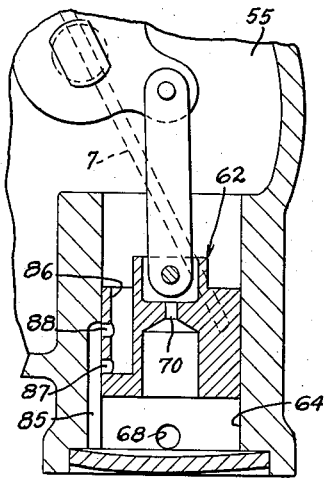
Fig. 14 is a view similar to Figs. 12 and 13 illustrating the suction motor during the latter portion of the warm-up period.

In the embodiment illustrated in Figs. 12 through 14, the cylinder 64 is provided with a groove 85, and the piston 62 is provided with a large, relatively unrestricted bore 86, and restricted, calibrated by-passes 87 and 88. As shown in Fig. 12, the engine has not yet been started. In Fig. 13, the engine has been started, and the initial pull-off effected by suction drawing the piston 62 into the cylinder 64 until the by-pass 87 has passed the top of the groove 85 in the cylinder. Again, the piston will hesitate in this position until the thermostatic spring 43 starts to warm up, at which time it will move at a relatively rapid rate to the position in Fig. 14, wherein the by-pass 88 has passed the top of the groove 85, whereupon the piston will continue to be drawn into the cylinder 64 by suction, but at a slower rate, opening the choke at the same rate as a conventional choke control.

Figure 15:
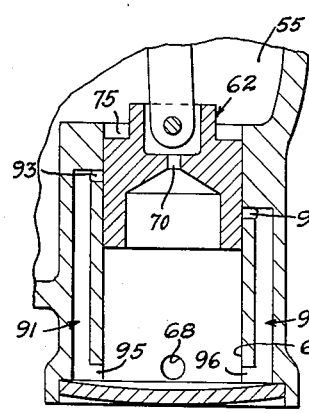
Fig. 15 is a sectional elevation view of a suction motor, and illustrates another embodiment of the invention prior to starting.
Figure 16:
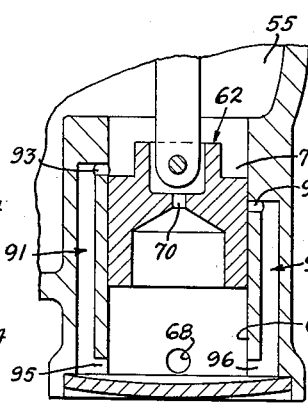
Fig. 16 is a view similar to Fig. 15 illustrating the suction motor immediately after starting.
Figure 17:
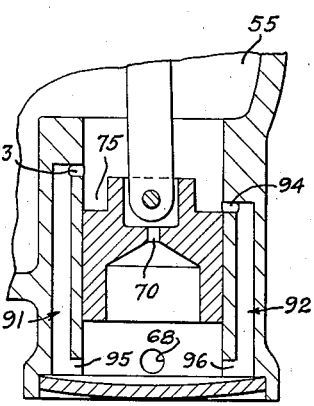
Fig. 17 is a view similar to Figs. 15 and 16 illustrating the suction motor during the latter portion and the warm-up period.

In the embodiment shown in Figs. 15, 16 and 17, the piston 62 is again provided with the reduced portion 75, as in the embodiments illustrated in Figs. 5 through 11. However, in this embodiment, by-passes 91 and 92 are formed as passageways around the cylinder 64. The by-pass 91 opens into the cylinder 64 through a port 93 above the port 94 in the by-pass system 92, both by-pass systems 91 and 92 opening into the lower portion of the cylinder through ports 95 and 96, respectively. Fig. 15 illustrates the position of the parts prior to starting. Upon starting, suction in the cylinder 64 draws the piston into the cylinder until the lower end of the reduced portion 75 on the piston passes port 93, whereupon the piston will hesitate until the thermostatic spring 43 has warmed up sufficiently to permit the piston to move at a relatively rapid rate until the lower end of the reduced portion 75 passes the port 94, as shown in Fig. 17, whereupon the piston will continue to move into the cylinder at the rate of a conventional suction motor piston.

All of the embodiments produce the same results, and different by-pass systems may be incorporated in the same suction motor. Although this invention has been described with reference to particular embodiments, features, and functional relationships, various changes will be apparent to one skilled in the art, and the invention is therefore not to be limited to such embodiments, features, or functional relationships except as set forth in the appended claims.

I claim:

1. In a carburetor for an engine, an induction conduit, a choke valve in said induction conduit, and means responsive to engine suction for partially opening said choke valve upon starting of said engine and for subsequently urging said choke valve open first with a relatively great force and then with a substantially reduced force and comprising, a suction motor having cooperating parts movable axially with respect to each other, one of said parts being responsive to engine suction to actuate said choke valve, another of said cooperating parts having an open end and another end having means for communicating with a source of engine suction, said cooperating parts having by-pass means to said open end of said other cooperating part and having leading portions at different locations along said axial direction of motion to be progressively uncovered for intermittently modifying the flow through the by-pass means as said cooperating parts move relative to each other between extremities of their respective axial motion responsive to said engine suction to provide the relatively great force and subsequently a reduced force.

2. In a carburetor for an engine, an induction conduit, a choke valve in said induction conduit, a thermostat operable to move said valve to closed position at low temperatures, and means responsive to engine suction for partially opening said choke valve upon cold starting of the engine and for subsequently urging said choke valve open first with a relatively great force and then with a substantially reduced force, said means responsive to engine suction comprising a suction motor having cooperating piston and cylinder parts movable axially with respect to each other, one of said parts being responsive to engine suction to actuate the choke valve, another of the cooperating parts having an open end and another end having means for communicating with a source of engine suction, said cooperating parts having by-pass means to said open end of said other cooperating part, said by-pass means having leading portions at different locations along said axial direction of motion to be progressively uncovered for intermittently modifying the flow through the by-pass means as said cooperating parts move relative to each other, said leading portions being spaced inward of said open end, said piston part being initially located during cold starting position at the open end of the cylinder part and closing the leading portions of all of said by-pass means, whereby engine suction is first applied to the piston part with a maximum force for partially opening said choke valve for cold starting and subsequently the leading portions of the by-pass means at different locations are opened by the axial travel of the piston part to first apply relatively great force to the piston for further opening of the choke valve and then subsequently reduced force is applied to the choke valve.

3. In a carburetor for an engine, an induction conduit, a choke valve in said induction conduit, and means responsive to engine suction tending to open said choke valve first relatively rapidly and then relatively slowly and comprising, a suction motor having cooperating parts including a piston in a cylinder, there being a pressure differential in said cylinder on opposite sides of said piston, the low pressure portion of said cylinder having means communicating with a source of engine suction, said cooperating parts having by-pass means from the high pressure portion of said cylinder to the low pressure portion of said cylinder, said by-pass means being sealed to said low pressure portion of said cylinder by said cooperating parts when said choke valve is closed, said by-pass means having axially arranged staggered outlets to be progressively uncovered as said piston moves in said cylinder responsive to engine suction to provide first relatively rapid and then relatively slow movement of said choke valve.

4. In a carburetor for an engine, an induction conduit, a choke valve in said induction conduit, means tending to close said choke valve, and means responsive to engine suction and opposing said first means for partially opening said choke valve upon starting of said engine and for subsequently urging said choke valve open, first relatively rapidly and then relatively slowly and comprising, cooperating parts including a piston slidably received in a cylinder, one end of said cylinder being exposed to engine suction, the other end of said cylinder being exposed to a higher pressure, one of said cooperating parts having by-pass means between said ends of said cylinder, each by-pass means having similar ends staggered with respect to each other in the direction of sliding motion of said piston in said cylinder, and passage means in another of said cooperating parts, said passage means communicating successively with said staggered ends of said by-pass means as said piston moves into the end of said cylinder exposed to engine suction and being sealed from said by-pass means when said piston is in said end of said cylinder exposed to a higher pressure.

5. In a carburetor for an engine, an induction conduit, a choke valve in said induction conduit, means tending to close said choke valve, and means responsive to engine suction and opposing the first said means for partially opening said choke valve upon starting of said engine and for subsequently urging said choke valve open, first relatively rapidly and then relatively slowly and comprising, a piston slidably received in a cylinder, one end of said cylinder being exposed to engine suction and the other end of said cylinder being exposed to a higher pressure, by-pass means in said piston, each by-pass means having one end communicating with said end of said cylinder exposed to a higher pressure and another end nearer the end of said cylinder exposed to said engine suction and staggered with respect to the similar end of another by-pass means in the direction of sliding motion of said piston in said cylinder, and passage means in said cylinder for communicating successively with said staggered ends of said by-pass means in said piston as said piston moves into the end of said cylinder exposed to engine suction and being sealed from said by-pass means when said piston is in said end of said cylinder exposed to a higher pressure.

6. In a carburetor for an engine, an induction conduit, a choke valve in said induction conduit, means tending to close said choke valve, and means responsive to engine suction and opposing the first said means for partially opening said choke valve upon starting of said engine and for subsequently urging said choke valve open, first relatively rapidly and then relatively slowly and comprising, a piston slidably received in a cylinder, one end of said cylinder being exposed to engine suction and the other end of said cylinder being exposed to a higher pressure, by-pass means in said piston, each by-pass means having one end communicating with said end of said cylinder exposed to a higher pressure and another end nearer the end of said cylinder exposed to said engine suction and staggered with respect to the similar end of another by-pass means in the direction of sliding motion of said piston in said cylinder, said by-pass means being reduced portions in the periphery of said piston, and passage means in said cylinder for communicating successively with said staggered ends of said reduced portions in said piston as said piston moves into the end of said cylinder exposed to engine suction and being sealed from said reduced portions when said piston is in said end of said cylinder exposed to a higher pressure.

7. In a carburetor for an engine, an induction conduit, a choke valve in said induction conduit, means tending to close said choke valve, and means responsive to engine suction and opposing the first said means for partially opening said choke valve upon starting of said engine and for subsequently urging said choke valve open, first relatively rapidly and then relatively slowly and comprising, a piston slidably received in a cylinder, one end of said cylinder being exposed to engine suction and the other end of said cylinder being exposed to a higher pressure, by-pass means in said piston, each by-pass means having one end communicating with said end of said cylinder exposed to a higher pressure and another end nearer the end of said cylinder exposed to said engine suction and staggered with respect to the similar end of another by-pass means in the direction of sliding motion of said piston in said cylinder, said staggered ends of said by-pass means comprising ports in said piston, and passage means in said cylinder for communicating successively with said ports in said piston as said piston moves into the end of said cylinder exposed to engine suction and being sealed from said ports when said piston is in said end of said cylinder exposed to a higher pressure.

8. In a carburetor for an engine, an induction conduit, a choke valve in said induction conduit, a chamber containing temperature responsive means urging said choke valve closed when said engine is cold and permitting said choke valve to open gradually as said temperature responsive means warms up, means communicating with said chamber and with a source of engine heat to permit a fluid responsive in temperature to the temperature of said engine to enter said chamber, and means responsive to engine suction for partially opening said choke valve against the urging of said temperature responsive means and for drawing said fluid through said chamber and across said temperature responsive means upon starting of said engine and for urging said choke valve open at a relatively rapid rate and subsequently at a reduced rate against the closing tendency of said temperature responsive means while drawing increasing quantities of said fluid through said chamber and across said temperature responsive means and comprising, a piston slidably received in a cylinder, one end of said cylinder being exposed to engine suction and the other end of said cylinder communicating with said chamber, by-pass means in said piston, each by-pass means having one end communicating with said end of said cylinder in communication with said chamber and another end nearer the end of said cylinder exposed to engine suction and staggered with respect to the similar end of another by-pass means in the direction of sliding motion of said piston in said cylinder, and passage means in said cylinder for communicating successively with said staggered ends of said by-pass means in said piston as said piston moves into the end of said cylinder exposed to engine suction and being sealed from said by-pass means when said piston is in said end of said cylinder in communication with said chamber.

9. In a carburetor for an engine, an induction conduit, a choke valve in said induction conduit, a chamber containing temperature responsive means urging said choke valve closed when said engine is cold and permitting said choke valve to open gradually as said temperature responsive means warms up, means communicating with said chamber and with a source of engine heat to permit a fluid responsive in temperature to the temperature of said engine to enter said chamber, and means responsive to engine suction for partially opening said choke valve against the urging of said temperature responsive means and for drawing said fluid through said chamber and across said temperature responsive means upon starting of said engine and for urging said choke valve open at a relatively rapid rate and subsequently at a reduced rate against the closing tendency of said temperature responsive means while drawing increasing quantities of said fluid through said chamber and across said temperature responsive means and comprising, a piston slidably received in a cylinder, one end of said cylinder being exposed to engine suction and the other end of said cylinder communicating with said chamber, by-pass means in said piston, each by-pass means having one end communicating with said end of said cylinder in communication with said chamber and another end nearer the end of said cylinder exposed to engine suction and staggered with respect to the similar end of another by-pass means in the direction of sliding motion of said piston in said cylinder, said by-pass means being reduced portions in the periphery of said piston, and passage means in said cylinder for communicating successively with said staggered ends of said reduced portions in said piston as said piston moves into the end of said cylinder exposed to engine suction and being sealed from said by-pass means when said piston is in said end of said cylinder in communication with said chamber.

10. In a carburetor for an engine, an induction conduit, a choke valve in said induction conduit, a chamber containing temperature responsive means urging said choke valve closed when said engine is cold and permitting said choke valve to open gradually as said temperature responsive means warms up, means communicating with said chamber and with a source of engine heat to permit a fluid responsive in temperature to the temperature of said engine to enter said chamber, and means responsive to engine suction for partially opening said choke valve against the urging of said temperature responsive means and for drawing said fluid through said chamber and across said temperature responsive means upon starting of said engine and for urging said choke valve open at a relatively rapid rate and subsequently at a reduced rate against the closing tendency of said temperature responsive means while drawing increasing quantities of said fluid through said chamber and across said temperature responsive means and comprising, a piston slidably received in a cylinder, one end of said cylinder being exposed to engine suction and the other end of said cylinder communicating with said chamber, by-pass means in said piston, each by-pass means having one end communicating with said end of said cylinder in communication with said chamber and another end nearer the end of said cylinder exposed to engine suction and staggered with respect to the similar end of another by-pass means in the direction of sliding motion of said piston in said cylinder, said staggered ends of said by-pass means comprising ports in said piston, and passage means in said cylinder for communicating successively with said ports in said piston as said piston moves into the end of said cylinder exposed to engine suction and being sealed from said by-pass means when said piston is in said end of said cylinder in communication with said chamber.

11. In a carburetor for an engine, an induction conduit, a choke valve in said induction conduit, means tending to close said choke valve, and means responsive to engine suction and opposing the first said means for partially opening said choke valve upon starting of said engine and for subsequently urging said choke valve open, first relatively rapidly and then relatively slowly and comprising, a piston slidably received in a cylinder, one end of said cylinder being exposed to engine suction and the other end of said cylinder being exposed to a higher pressure, by-pass means in said cylinder, each by-pass means having an end communicating with said end of said cylinder exposed to engine suction and another end nearer the end of said cylinder exposed to a higher pressure and staggered with respect to the similar end of another by-pass means in the direction of sliding motion of said piston in said cylinder, said by-pass means being recesses in said cylinder wall, one of said recesses having a smaller cross sectional area than another of said recesses in a plane transverse to the direction of sliding motion of said piston in said cylinder, said recesses communicating with each other, and passage means in said piston communicating successively with the staggered ends of said recesses in said cylinder as said piston moves into the end of said cylinder exposed to engine suction and being sealed from said recesses when said piston is in said end of said cylinder exposed to a higher pressure.

12. In a carburetor for an engine, an induction conduit, a choke valve in said induction conduit, means tending to close said choke valve, and means responsive to engine suction and opposing the first said means for partially opening said choke valve upon starting of said engine and for subsequently urging said choke valve open, first relatively rapidly and then relatively slowly and comprising, a piston slidably received in a cylinder, one end of said cylinder being exposed to engine suction and the other end of said cylinder being exposed to a higher pressure, by-pass means in said cylinder, each by-pass means having an end communicating with said end of said cylinder exposed to engine suction and another end nearer the end of said cylinder exposed to a higher pressure and staggered with respect to the similar end of another by-pass means in the direction of sliding motion of said piston in said cylinder, said staggered ends of said by-pass means comprising ports in said cylinder wall, and passage means in said piston communicating successively with said ports in said cylinder as said piston moves into the end of said cylinder exposed to engine suction and being sealed from said ports when said piston is in said end of said cylinder exposed to a higher pressure.

13. In a carburetor for an engine, an induction conduit, a choke valve in said induction conduit, a chamber containing temperature responsive means urging said choke valve closed when said engine is cold and permitting said choke valve to open gradually as said temperature responsive means warms up, means communicating with said chamber and with a source of engine heat to permit a fluid responsive in temperature to the temperature of said engine to enter said chamber, and means responsive to engine suction for partially opening said choke valve against the urging of said temperature responsive means and for drawing said fluid through said chamber and across said temperature responsive means upon starting of said engine and for urging said choke valve open at a relatively rapid rate and subsequently at a reduced rate against the closing tendency of said temperature responsive means while drawing increasing quantities of said fluid through said chamber and across said temperature responsive means and comprising, a piston slidably received in a cylinder, one end of said cylinder being exposed to engine suction and the other end of said cylinder communicating with said chamber, by-pass means in said cylinder, each by-pass means having an end communicating with said end of said cylinder exposed to engine suction and another end nearer the end of said cylinder in communication with said chamber and staggered with respect to the similar end of another by-pass means in the direction of sliding motion of said piston in said cylinder, and passage means in said piston for communicating successively with said staggered ends of said by-pass means in said cylinder as said piston moves into the end of said cylinder exposed to engine suction and being sealed from said by-pass means when said piston is in said end of said cylinder in communication with said chamber.

14. In a carburetor for an engine, an induction conduit, a choke valve in said induction conduit, a chamber containing temperature responsive means urging said choke valve closed when said engine is cold and permitting said choke valve to open gradually as said temperature responsive means warms up, means communicating with said chamber and with a source of engine heat to permit a fluid responsive in temperature to the temperature of said engine to enter said chamber, and means responsive to engine suction for partially opening said choke valve against the urging of said temperature responsive means and for drawing said fluid through said chamber and across said temperature responsive means upon starting of said engine and for urging said choke valve open at a relatively rapid rate and subsequently at a reduced rate against the closing tendency of said temperature responsive means while drawing increasing quantities of said fluid through said chamber and across said temperature responsive means and comprising, a piston slidably received in a cylinder, one end of said cylinder being exposed to engine suction and the other end of said cylinder communicating with said chamber, by-pass means in said cylinder, each by-pass means having an end communicating with said end of said cylinder exposed to engine suction and another end nearer the end of said cylinder in communication with said chamber and staggered with respect to the similar end of another by-pass means in the direction of sliding motion of said piston in said cylinder, said by-pass means being recesses in said cylinder wall, one of said recesses having a smaller cross sectional area than another of said recesses in a plane transverse to the direction of sliding motion of said piston in said cylinder, said recesses communicating with each other, and passage means in said piston for communicating successively with said staggered ends of said recesses in said cylinder as said piston moves into the end of said cylinder exposed to engine suction and being sealed from said recesses when said piston is in said end of said cylinder in communication with said chamber.

15. In a carburetor for an engine, an induction conduit, a choke valve in said induction conduit, a chamber containing temperature responsive means urging said choke valve closed when said engine is cold and permitting said choke valve to open gradually as said temperature responsive means warms up, means communicating with said chamber and with a source of engine heat to permit a fluid responsive in temperature to the temperature of said engine to enter said chamber, and means responsive to engine suction for partially opening said choke valve against the urging of said temperature responsive means and for drawing said fluid through said chamber and across said temperature responsive means upon starting of said engine and for urging said choke valve open at a relatively rapid rate and subsequently at a reduced rate against the closing tendency of said temperature responsive means while drawing increasing quantities of said fluid through said chamber and across said temperature responsive means and comprising, a piston slidably received in a cylinder, one end of said cylinder being exposed to engine suction and the other end of said cylinder communicating with said chamber, by-pass means in said cylinder, each by-pass means having an end communicating with said end of said cylinder exposed to engine suction and another end nearer the end of said cylinder in communication with said chamber and staggered with respect to the similar end of another by-pass means in the direction of sliding motion of said piston in said cylinder, said by-pass means being recesses in said cylinder wall, said recesses being peripherally spaced in said cylinder wall, and passage means in said piston for communicating successively with said staggered ends of said recesses in said cylinder as said piston moves into the end of said cylinder exposed to engine suction and being sealed from said recesses when said piston is in said end of said cylinder in communication with said chamber.

16. In a carburetor for an engine, an induction conduit, a choke valve in said induction conduit, a chamber containing temperature responsive means urging said choke valve closed when said engine is cold and permitting said choke valve to open gradually as said temperature responsive means warms up, means communicating with said chamber and with a source of engine heat to permit a fluid responsive in temperature to the temperature of said engine to enter said chamber, and means responsive to engine suction for partially opening said choke valve against the urging of said temperature responsive means and for drawing said fluid through said chamber and across said temperature responsive means upon starting of said engine and for urging said choke valve open at a relatively rapid rate and subsequently at a reduced rate against the closing tendency of said temperature responsive means while drawing increasing quantities of said fluid through said chamber and across said temperature responsive means and comprising, a piston slidably received in a cylinder, one end of said cylinder being exposed to engine suction and the other end of said cylinder communicating with said chamber, by-pass means in said cylinder, each by-pass means having an end communicating with said end of said cylinder exposed to engine suction and another end nearer the end of said cylinder in communication with said chamber and staggered with respect to the similar end of another by-pass means in the direction of sliding motion of said piston in said cylinder, said staggered ends of said by-pass means comprising ports in said cylinder wall, and passage means in said piston for communicating successively with said ports in said cylinder as said piston moves into the end of said cylinder exposed to engine suction and being sealed from said recesses when said piston is in said end of said cylinder in communication with said chamber.

References Cited in the file of this patent

UNITED STATES PATENTS

| | | |
|---|---|---|
| 2,215,682 | Winkler | Sept. 24, 1940 |
| 2,698,168 | Olson | Dec. 28, 1954 |
| 2,818,238 | Olson | Dec. 31, 1957 |
| 2,848,201 | Bennett | Aug. 19, 1958 |
| 2,864,596 | Dermond | Dec. 16, 1958 |
| 2,885,193 | Gornall | May 5, 1959 |